(12) United States Patent
Maehara

(10) Patent No.: US 10,946,450 B2
(45) Date of Patent: Mar. 16, 2021

(54) MACHINE TOOL

(71) Applicants: CITIZEN WATCH CO., LTD., Tokyo (JP); CITIZEN MACHINERY CO., LTD., Nagano (JP)

(72) Inventor: Tomonori Maehara, Tokorozawa (JP)

(73) Assignees: CITIZEN WATCH CO., LTD., Tokyo (JP); CITIZEN MACHINERY CO., LTD., Nagano (JP)

( * ) Notice: Subject to any disclaimer, the term of this patent is extended or adjusted under 35 U.S.C. 154(b) by 73 days.

(21) Appl. No.: 16/328,586

(22) PCT Filed: Jun. 19, 2017

(86) PCT No.: PCT/JP2017/022470
§ 371 (c)(1),
(2) Date: Feb. 26, 2019

(87) PCT Pub. No.: WO2018/042831
PCT Pub. Date: Mar. 8, 2018

(65) Prior Publication Data
US 2020/0215617 A1    Jul. 9, 2020

(30) Foreign Application Priority Data
Aug. 31, 2016    (JP) .............................. JP2016-170350

(51) Int. Cl.
*B23B 3/16* (2006.01)
*B23B 29/24* (2006.01)
*B23B 3/06* (2006.01)

(52) U.S. Cl.
CPC ................ *B23B 3/16* (2013.01); *B23B 29/24* (2013.01); *B23B 3/065* (2013.01); *Y10T 29/5168* (2015.01);
(Continued)

(58) Field of Classification Search
CPC .............. B23B 25/06; B23B 2260/128; B23B 2270/48
See application file for complete search history.

(56) References Cited

U.S. PATENT DOCUMENTS

| | | |
|---|---|---|
| 5,564,171 A | 10/1996 | Ozawa et al. |
| 7,043,332 B1 | 5/2006 | Fujinawa et al. |

(Continued)

FOREIGN PATENT DOCUMENTS

| | | |
|---|---|---|
| CN | 1454335 A | 11/2003 |
| CN | 201664784 U | 12/2010 |

(Continued)

OTHER PUBLICATIONS

Extended European Search Report issued in European Patent Application No. 17845841.0, dated Mar. 23, 2020.

(Continued)

*Primary Examiner* — Alan Snyder
(74) *Attorney, Agent, or Firm* — Knobbe, Martens, Olson & Bear, LLP

(57) ABSTRACT

An automatic lathe includes a positioning block that positions a rod material, the rod material projecting from a main spindle contacting the positioning block, and a sensor that moves in a direction intersecting with a shaft center C direction of the main spindle to detect a cut off condition of the rod material. The positioning block includes a groove that allows movement of the sensor, and moves in the same direction as a movement direction of the sensor between a position that contacts the rod material and a position that has no contact with the rod material. The sensor moves along the path in the position that has no contact with the rod material.

5 Claims, 7 Drawing Sheets

(52) U.S. Cl.
CPC ........ *Y10T 29/5173* (2015.01); *Y10T 82/2543* (2015.01)

(56) References Cited

U.S. PATENT DOCUMENTS

| | | |
|---|---|---|
| 9,421,667 B2 | 8/2016 | Gaegauf |
| 2001/0043488 A1 | 11/2001 | Weber et al. |
| 2005/0217442 A1 | 10/2005 | Akimoto et al. |
| 2009/0133239 A1 | 5/2009 | Tanaka |
| 2014/0102268 A1 | 4/2014 | Hariki et al. |
| 2017/0072473 A1 | 3/2017 | Kawasumi |

FOREIGN PATENT DOCUMENTS

| | | |
|---|---|---|
| CN | 203495331 U | 3/2014 |
| CN | 103857493 A | 6/2014 |
| EP | 0613745 A1 | 9/1994 |
| EP | 1321212 A1 | 6/2003 |
| EP | 2062686 A1 | 5/2009 |
| JP | 62-102953 A | 5/1987 |
| JP | 04-365501 A | 12/1992 |
| JP | 5-301148 A | 11/1993 |
| JP | 6-039603 A | 2/1994 |
| JP | 6-246508 A | 9/1994 |
| JP | 10-015702 A | 1/1998 |
| JP | 2001-198701 A | 7/2001 |
| JP | 2002-066806 A | 3/2002 |
| JP | 2003-080403 A | 3/2003 |
| JP | 2008-246642 A | 10/2008 |
| JP | 4-266295 B2 | 5/2009 |
| JP | 4-997240 B2 | 8/2012 |
| JP | 2016-036868 A | 3/2016 |
| TW | 207660 B | 6/1993 |
| TW | 440835 B | 6/2001 |
| TW | 201328816 A | 7/2013 |
| TW | 201400214 A | 1/2014 |
| WO | WO 2002//24386 A1 | 1/2004 |
| WO | WO 2008/013313 A1 | 1/2008 |
| WO | WO 2014/027464 A1 | 2/2014 |

OTHER PUBLICATIONS

Chinese Office Action issued in Chinese Patent Application No. 201780049903.0, dated Apr. 7, 2020.
Office Action issued in Japanese Patent Application No. 2016-174600, dated Jun. 30, 2020.
Office Action issued in Taiwanese Patent Application No. 106122074, dated Jul. 15, 2020.

MACHINE TOOL

CROSS-REFERENCE TO RELATED APPLICATION

This application is a national stage application of PCT Application No. PCT/JP2017/022470, filed on Jun. 19, 2017, which claims priority to Japanese Patent Application No. 2016-170350, filed on Aug. 31, 2016, the disclosure of which is incorporated herein by reference. Also, any applications for which a foreign or domestic priority claim is identified in the Application Data Sheet as filed with the present application are hereby incorporated by reference under 37 CFR 1.57.

TECHNICAL FIELD

The present disclosure relates to a machine tool.

BACKGROUND ART

In a machine tool, a rod material projecting from a leading end of a main spindle contacts a positioning member, so as to be positioned for machining. The machined part of the rod material is cut off by a cutting-off process with a cutting-off tool. After the cutting-off process, the cut off condition is determined (see, JP4266295B, for example). The machine tool described in Patent Literature 1 includes a sensor that contacts the rod material as a detector to determine the cut off condition by moving the detector. It is also generally known to determine a cut off condition by moving a detector in a direction intersecting with an axis direction of a main spindle.

SUMMARY

The rod material is positioned with the positioning member after the cut off condition is determined. For this reason, the detector is placed to determine the cut off condition by moving in the direction intersecting with the axis direction of the main spindle. When it is determined that the cutting-off process is appropriately performed to the rod material, the positioning member is placed in a previously set position, and the leading end surface of the rod material contacts the positioning member. The rod material is thereby positioned.

More specifically, after the cutting-off process is completed, it is necessary to move the detector to a predetermined position which enables the determination of the cut off condition and to move the positioning member to a predetermined position which enables the contact of the rod material. The times to move both the detector and the positioning member lengthen a time required for machining. It is desired to shorten a cycle time of entire machining.

The present disclosure has been made in view of the above circumstances, and an object of the present disclosure is to provide a machine tool capable of shortening a time required for an operation of detecting a cut off condition and an operation of positioning a rod material.

A machine tool includes a positioning member that positions a rod material, the rod material that projects from a main spindle contacts the positioning member to be positioned; and a detector that moves in a direction intersecting with an axis direction of the main spindle to detect a cut off condition of the rod material, wherein the positioning member includes a path that allows movement of the detector, and moves in a same direction as a movement direction of the detector between a position that contacts the rod material and a position that has no contact with the rod material, and the detector moves along the path when the positioning member moves to the position that has no contact with the rod material.

DESCRIPTION OF EMBODIMENT

Figure 1:
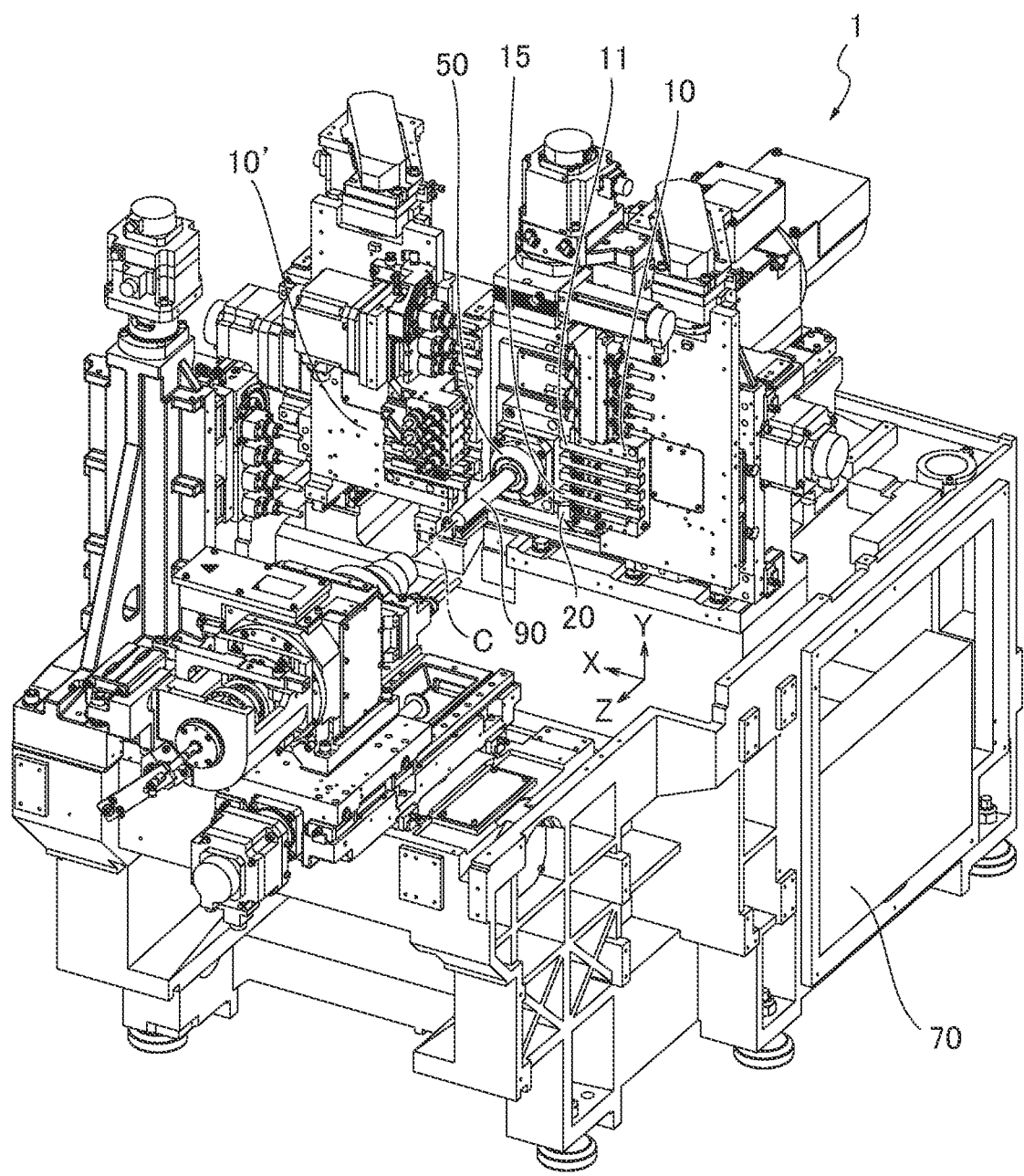
FIG. 1 is an approximate perspective view illustrating an automatic lathe as one embodiment of a machine tool of the present disclosure.

As illustrated in FIG. 1, an automatic lathe 1 as one example of a machine tool according to the present disclosure machines a rod material 90 in front of a main spindle 50 in an axis direction (Z direction) with a tool 11 according to control of a controller 70. The tool 11 is fixed to a tool post 10 having a tooth comb shape. The rod material 90 is held by the main spindle 50 and projects from the main spindle 50. The tool post 10 includes a turning tool post capable of turning about a Y axis in a Y direction orthogonal to a Z direction. The turning tool post is integrally fixed to the tool post 10. The turning tool post enables the rod material 90 to be B-axis machined. The rod material 90 may be processed with a tool fixed to another tool post 10' having a tooth comb shape. The tool post 10' faces the tool post 10 via a shaft C of the main spindle 50. The tool post 10' is supported to be movable in the axis direction (Z direction) of the main spindle 50. The rod material 90 is supplied to the main spindle 50 from the rear with a known rod feeder, for example.

The tool post 10 moves in the horizontal X direction and the vertical Y direction which are orthogonal to each other with respect to the shaft C. The tool post 10 is provided with a plurality of tools 11 for machining. A plurality of tools 11 includes a cutting-off tool 15 for a cutting-off process of cutting off a machined portion of the rod material 90. A plurality of tools 11 is arranged in the tool post 10 in the Y direction.

The tool post 10 retracts in the X direction such that each tool 11 has no contact with the rod material 90. The tool post 10 moves in the Y direction to select the tool 11 to be used for machining, and the tool post 10 moves toward the rod material 90 in the X direction such that the selected tool 11 machines the rod material 90.

Figure 2:
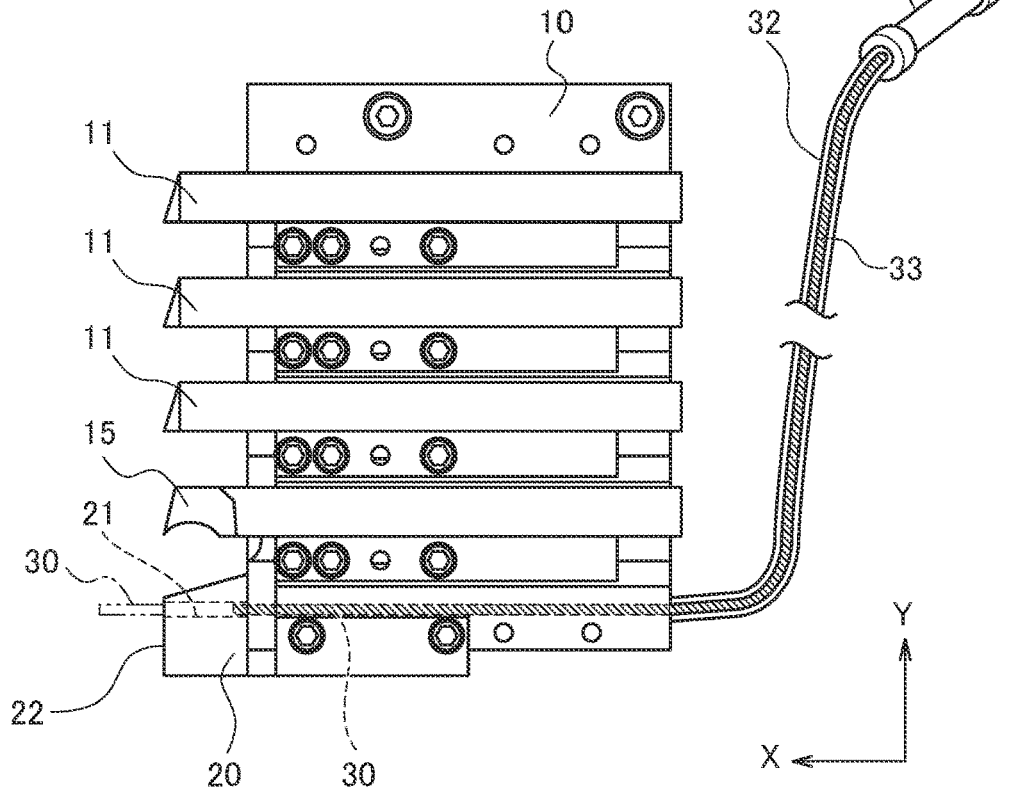
FIG. 2 is a front view of a tool post, a positioning block, and a cutting-off detector in the automatic lathe illustrated in FIG. 1.
Figure 3:
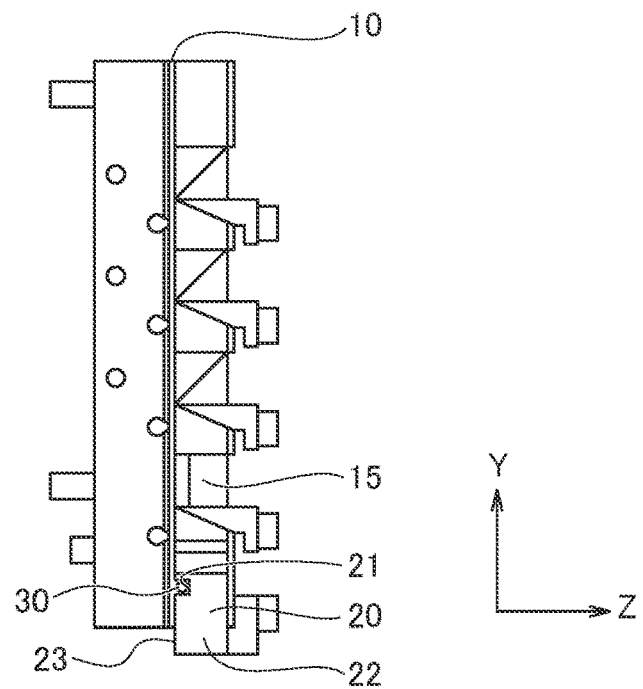
FIG. 3 is a side view of the tool post, the positioning block, and the cutting-off detector in the automatic lathe illustrated in FIG. 1.

As illustrated in FIGS. 2, 3, a positioning block 20 (one example of positioning member) is integrally fixed to the tool post 10 below the cutting-off tool 15. The positioning block 20 moves in the X direction and the Y direction by the movement of the tool post 10.

The positioning block 20 includes, on the main spindle 50 side thereof, a contact surface 23 that a leading end surface 91 of the rod material 90 contacts. The positioning block 20 can move from the contact position capable of contacting the rod material 90 (leading end surface 91) to a retracted position (noncontact position) that has no contact with the rod material 90 in the X direction by the movement of the tool post 10.

As illustrated in FIG. 2, the positioning block 20 is provided with a groove 21 (one example of path) extending in the X direction (direction orthogonal to axis direction of main spindle 50). This groove 21 is provided in the contact surface 23 as a concave portion, as illustrated in FIG. 3. A rod like rigid sensor 30 (one example of detector) straightly extending along the groove 21 is disposed in the groove 21. An air cylinder 31 is connected to the sensor 30 through a bendable wire 33 that moves forward and backward along a guide 32.

The sensor 30 moves in the X direction along the groove 21 by the air cylinder 31. When the wire 33 is fed from the guide 32 by the operation of the air cylinder 31, the sensor 30 pushed by the wire 33 moves forward in the X direction, and projects from an inner end surface 22 of the positioning block 20, as illustrated by the two-dot chain line in FIG. 2. On the other hand, when the wire 33 is pulled into the guide 32 by the operation of the air cylinder 31, the sensor 30 pulled by the wire 33 retracts in the X direction, and the wire 33 is placed inside the inner end surface 22 of the positioning block 20, as illustrated by the broken line in FIG. 2.

When the sensor 30 contacts the rod material 90, the movement of the sensor 30 is controlled. The controller 70 can detect whether the rod material 90 is appropriately cut off or not (one example of cut off condition) by the cutting-off process in accordance with a projection length of the detector 30. The sensor 30, the air cylinder 31, the guide 32, the wire 33, the controller 70, and the like constitute a cutting-off detection device.

Figure 4:
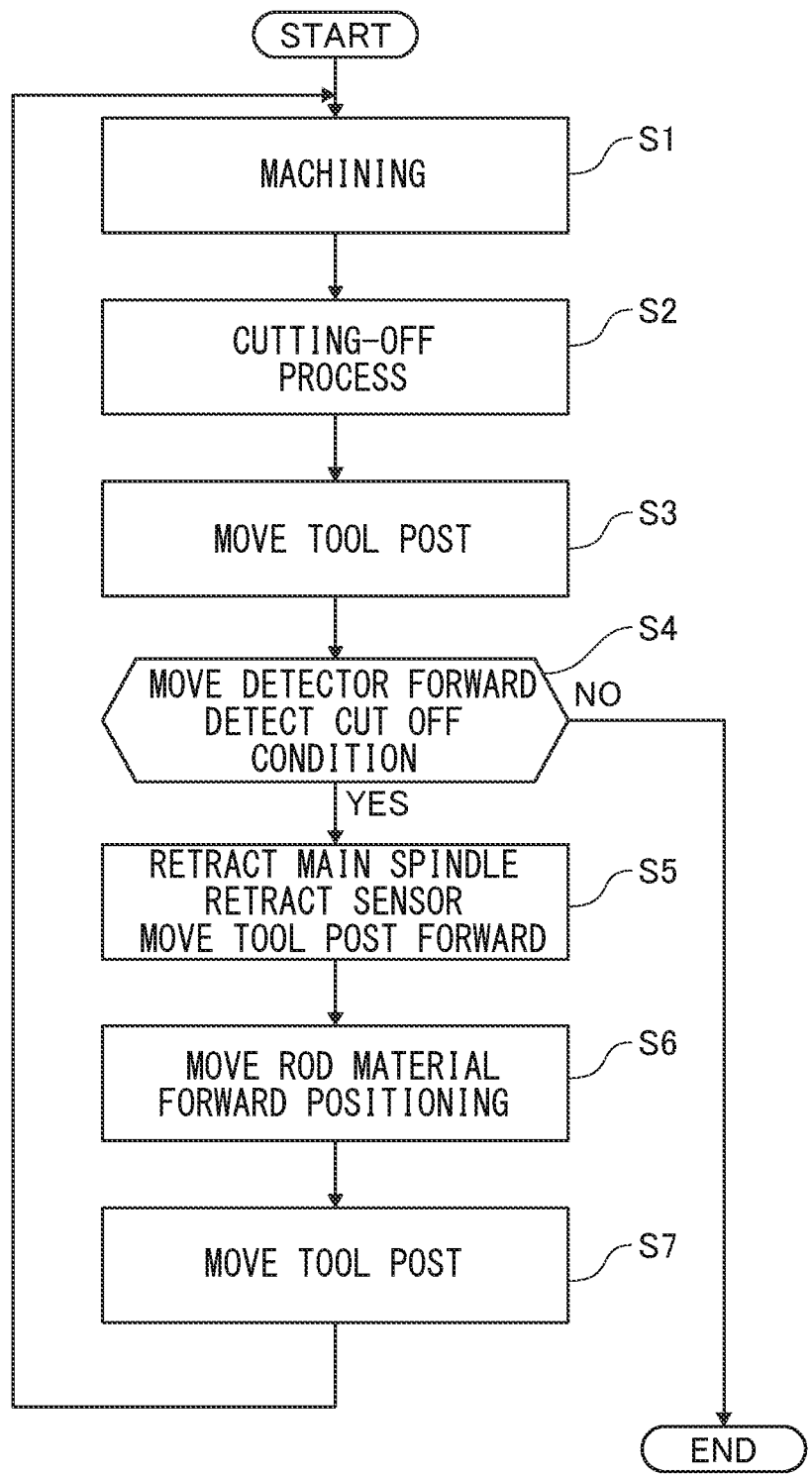
FIG. 4 is a flowchart showing a process of an operation of detecting a cut off condition and an operation of positioning in the automatic lathe illustrated in FIG. 1.
Figure 5:
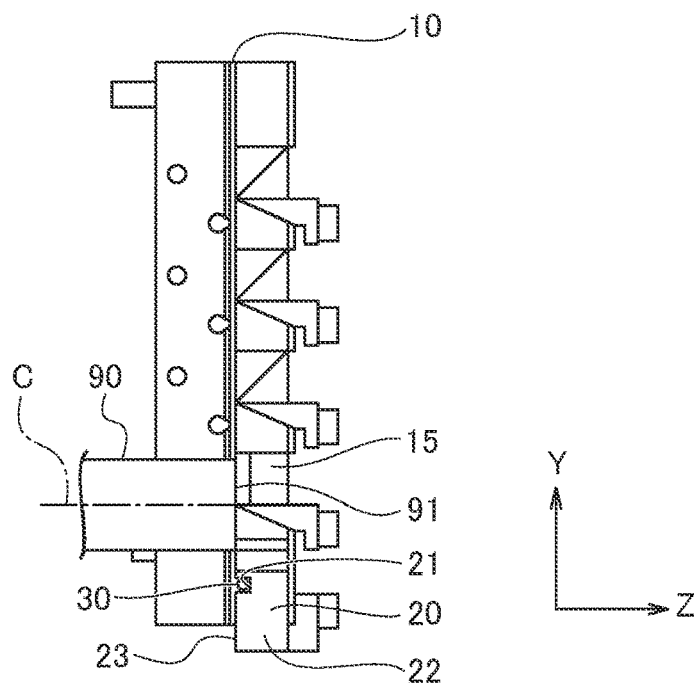
FIG. 5 is a side view corresponding to FIG. 3, illustrating a positional relationship between a rod material and the tool post after Step 2 (S2) in FIG. 4.

The automatic lathe 1 configured as described above operates in accordance with the process flow shown in FIG. 4. A normal machining is performed to the rod material 90 with the tool 11 (S1). After this machining is completed, the cutting-off process is performed with the cutting-off tool 15 (S2). When the cutting-off process is normally performed without damaging the tool 15, the cut off portion by the cutting-off process for example falls down. Thus, the cut off portion is not illustrated in the figure as FIG. 5

Figure 6:
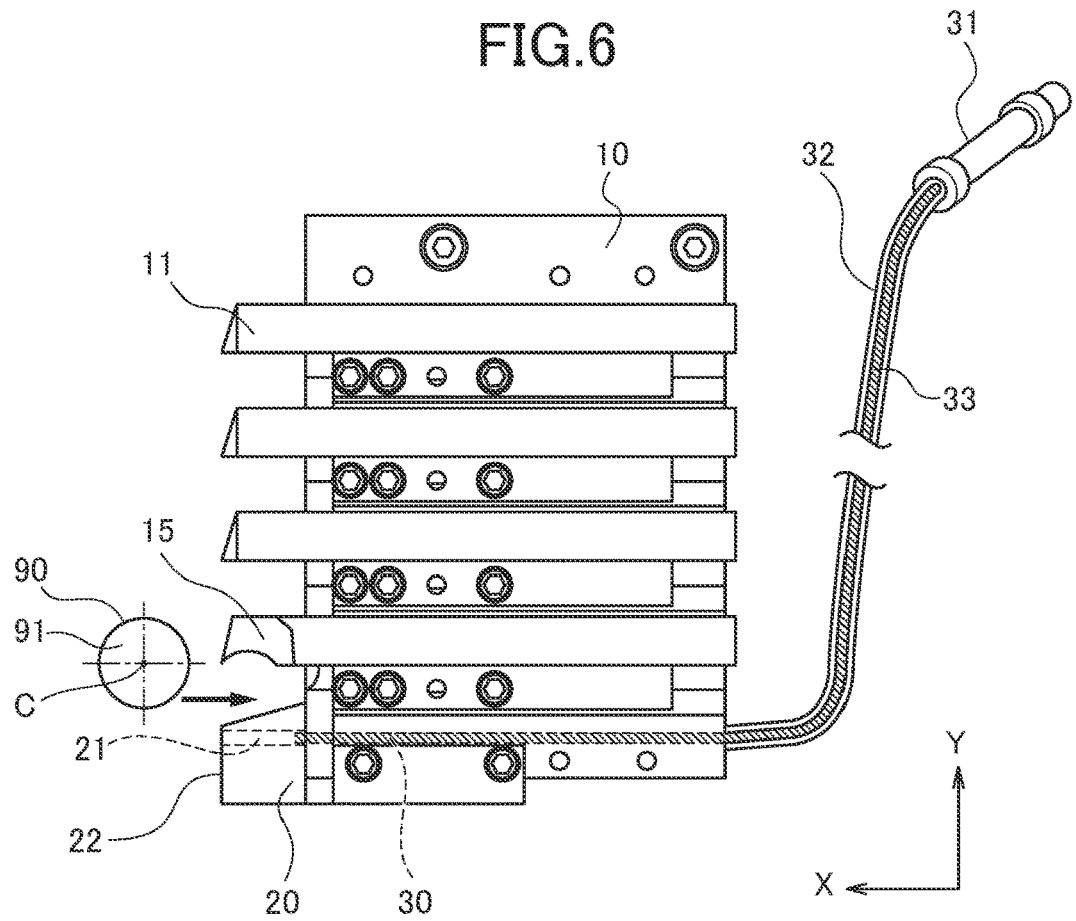
FIG. 6 is a front view corresponding to FIG. 2, illustrating a positional relationship between the rod material and the tool post after Step 3 (S3) in FIG. 4.
Figure 7:
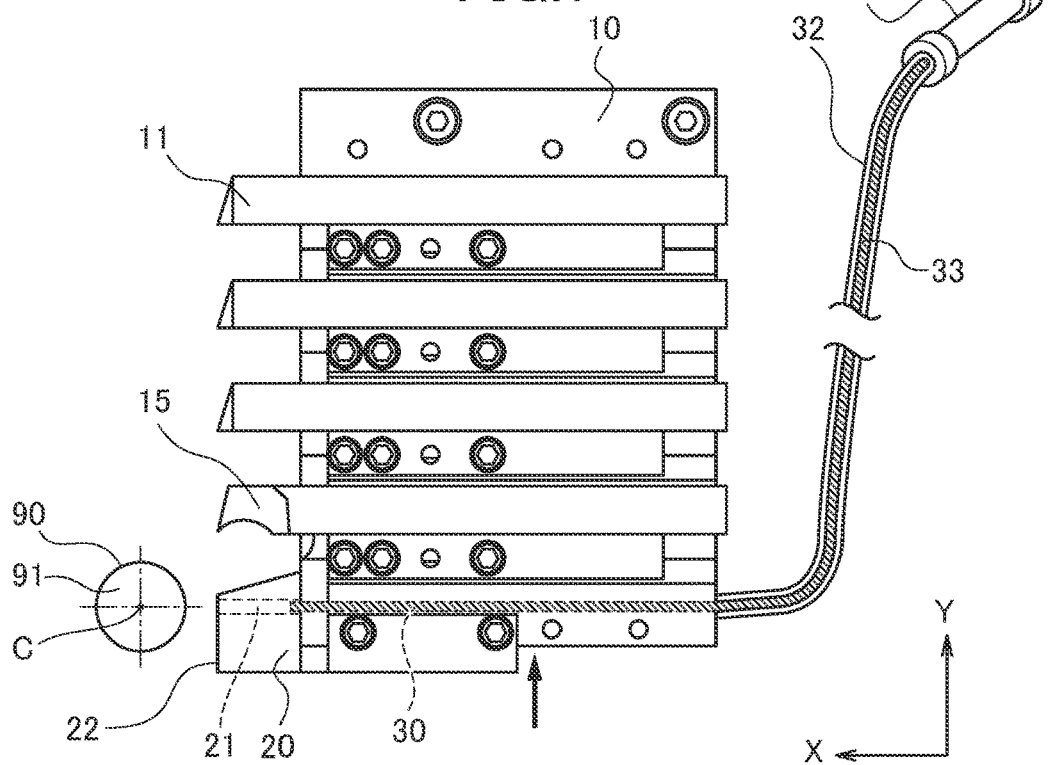
FIG. 7 is a front view corresponding to FIG. 2, illustrating a positional relationship between the rod material and a sensor before the cut off condition is detected after the condition illustrated in FIG. 6.
Figure 8:
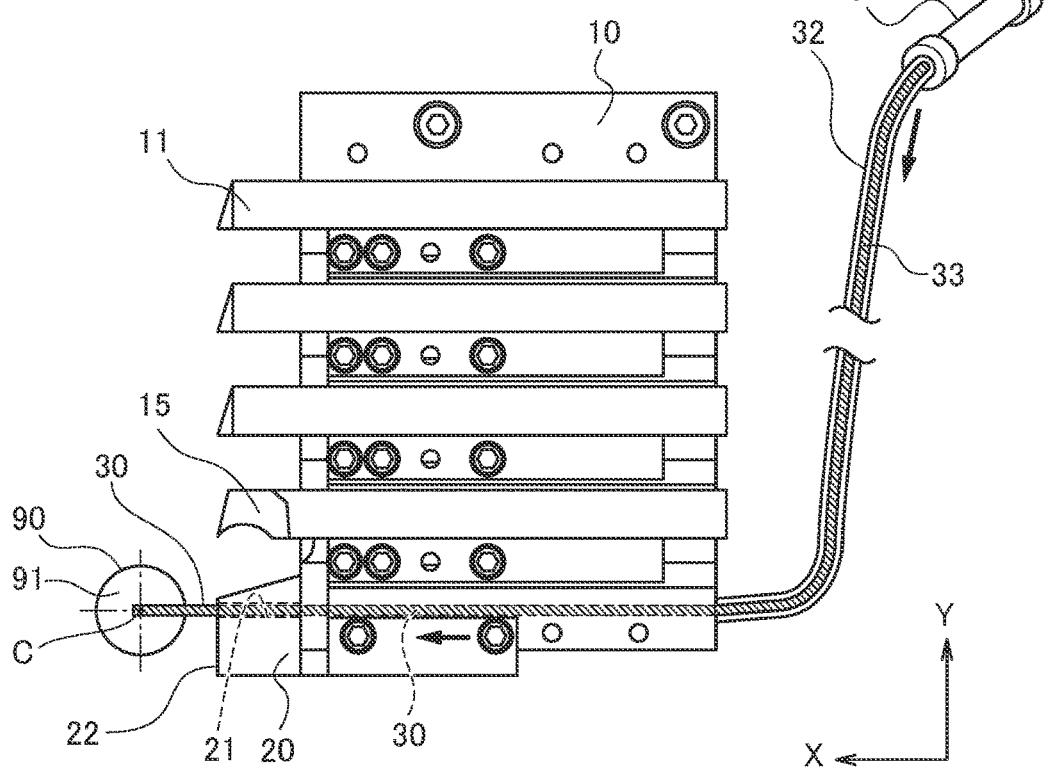
FIG. 8 is a front view corresponding to FIG. 2, illustrating a positional relationship between the rod material and the sensor in Step 4 (S4) in FIG. 4.
Figure 9:
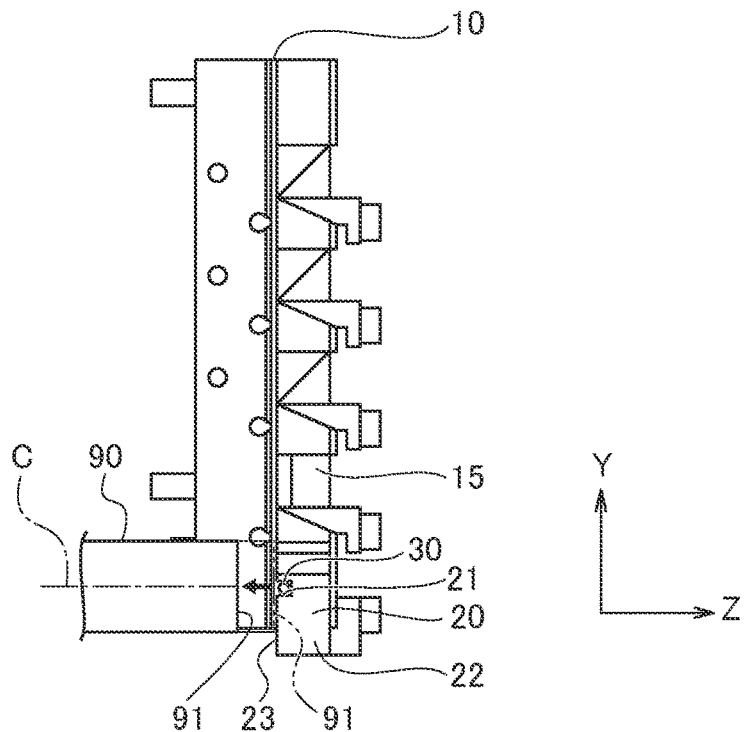
FIG. 9 is a side view corresponding to FIG. 3, illustrating a positional relationship between the positioning block and the rod material when a main spindle is retracted in Step 5 (S5) in FIG. 4.

As illustrated in FIG. 6, after the cutting-off process, the tool post 10 retracts in the X direction (S3 in FIG. 4), and moves in the Y direction (S3 in FIG. 4) such that the center of the groove 21 is aligned with the shaft center C in the Y direction, and the detector 30 is placed in the same position as the shaft center C, as illustrated in FIG. 7. In this case, the positioning block 20 is placed in a retracted position. After that, the sensor 30 moves forward in the X direction by the control of the controller 70, so that the controller 70 detects the cut off condition (S4 in FIG. 4). When the controller 70 detects that the cutting-off process is not normally performed (No in S4 in FIG. 4), the process by the automatic lathe 1 is completed as the cutting-off tool 15 may be damaged.

Figure 10:
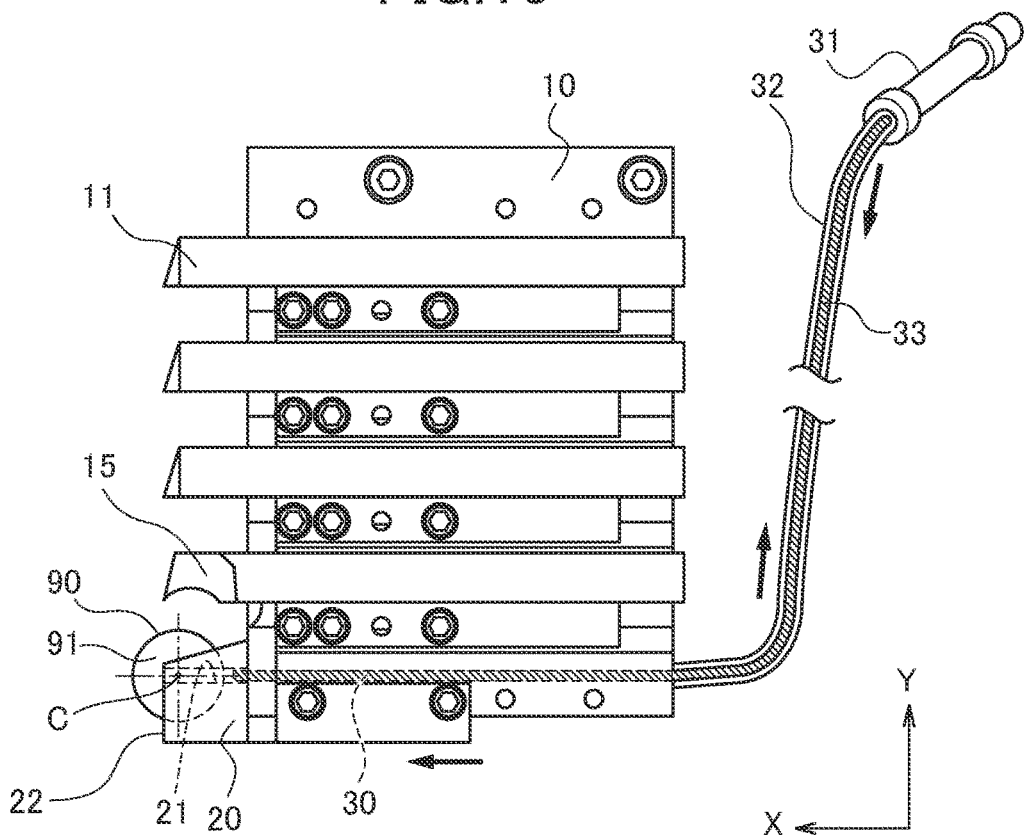
FIG. 10 is a front view corresponding to FIG. 2, illustrating a positional relationship among the rod material, the positioning block, and the sensor before the rod material is positioned in Step 5 (S5) in FIG. 4.

When the controller 70 detects that the cutting-off process is normally performed (YES in S4 in FIG. 4), the automatic lathe 1 positions the rod material 90 in the Z direction. As illustrated in FIG. 10, the controller 70 operates the air cylinder 31 to pull the wire 33, so as to pull the detector 30 inside the positioning block 20 along the groove 21. The controller 70 also moves the tool post 10 forward in the X direction, so as to dispose the positioning block 20 on the shaft C (S5 in FIG. 4).

Figure 11:
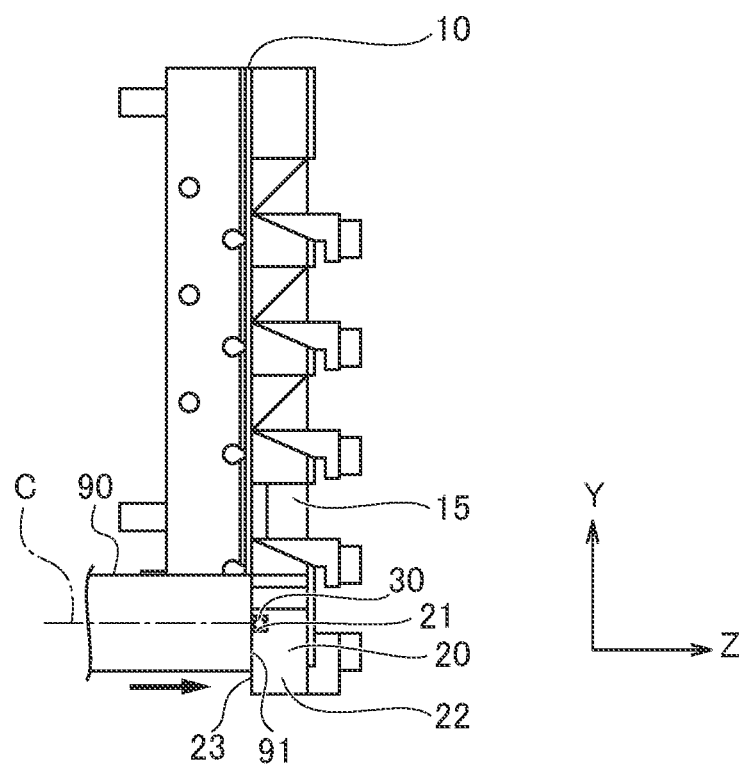
FIG. 11 is a side view corresponding to FIG. 3, illustrating a positional relationship between the rod material and the positioning block when the rod material is positioned in Step 6 (S6) in FIG. 4.

Next, the controller 70 opens a chuck of the main spindle 50, which holds the rod material 90, to move the rod material 90 in the Z direction (S6 in FIG. 4). The rod material 90 thereby moves forward in the Z direction. As illustrated in FIG. 11, the leading end surface 91 contacts the contact surface 23 of the positioning block 20, so as to position the rod material 90 (S6 in FIG. 4).

When the rod material 90 is positioned, the controller 70 retracts the main spindle 50 based on the length for machining, and controls the rod material 90 to be chucked. After that, the controller 70 retracts the tool post 10 in the X direction such that the positioning block 20 separates from the rod material 90, and moves the tool post 10 in the Y direction to select a predetermined tool 11 for next machining (S7 in FIG. 4). After that, the process returns to Step 1 (S1), and the controller 70 controls the main spindle 50 and the tool post 10 for next machining of the rod material 90. Then, the above operations are repeated.

According to the automatic lathe 1 of the embodiment configured as described above, the cut off condition is detected by moving the sensor 30 along the groove 21. As the movement direction (X direction) at the detection operation of the sensor 30 is the same as the movement direction (X direction) at the positioning operation of the positioning block 20, the rod material 90 can be positioned by simply moving in the X direction without moving the tool post 10 in the Y direction after the detection of the cut off condition. Accordingly, the time required for the operation of detecting the cut off condition and the operation of positioning can be shortened compared to the configuration in which the positioning block 20 is moved forward in the X direction toward the shaft C after the tool post 10 is moved in the Y direction.

In the automatic lathe 1 of the embodiment, the positioning block 20 is fixed to the tool post 10. Such a configuration can eliminate the need for providing a movement device for moving the positioning block 20 separately from the tool post 10. However, the machine tool according to this disclosure is not limited to the one in which the positioning member is fixed to the tool post, and may be the one in which the positioning member is provided separately from the tool post, so as to move independently from the tool post.

In the automatic lathe 1 of the embodiment, the path through which the sensor 30 passes is provided in the contact surface 23 of the positioning block 20 as a concave portion. The path can be easily provided by simply cutting the contact surface 23 into the concave shape. However, the machine tool according to this disclosure is not limited to the one in which the path through which the sensor passes is provided in the contact surface of the positioning member. The path may be a hole which is a columnar space provided inside the positioning member.

The concave portion provided in the contact surface 23 is not limited to the groove 21 (a groove having a bottom and both sides (including a smooth continuous concave portion which does not have separate bottom and both sides)). The concave portion may be, for example, a notch as a concave portion without having one side or a slit as a concave portion without having a bottom.

In the automatic lathe 1 of the embodiment, the center of the groove 21 as one example of the concave portion is aligned with the shaft center C as a center of the leading end surface 91 of the rod material 90 when the leading end surface 91 of the rod material 90 contacts the contact surface 23 of the positioning block 20. Even if a columnar boss projecting from the leading end surface 91 in the Z direction remains in the center of the leading end surface 91 of the rod material 90 in the cutting-off process, such a projected boss enters the groove 21 provided in the contact surface 23 in the positioning. The leading end surface 91 therefore contacts the contact surface 23, and it is possible to prevent decrease in the accuracy of the positioning of the rod material 90 due to the contact of the boss to the contact surface 23.

The machine tool according to this disclosure is not limited to the one including the concave portion having the center aligned with the center of the leading end surface of the rod material when the leading end surface of the rod material contacts the contact surface of the positioning member, and may be the one including a concave portion having the center misaligned with the center of the leading end surface of the rod material.

The embodiment is described with the example that detects the cut-off condition by moving the rigid sensor 30 forward in the X direction along the groove 21. The cutting-off detection device may be configured to detect the cut off condition by irradiating the laser light and receiving the reflected laser light. In this case, the irradiated laser light and the reflected laser light can travel forward along the groove 21.

What is claimed is:

1. A machine tool comprising:
a positioning block that contacts and positions a rod material projecting from a main spindle; and
a detector that moves in a direction intersecting with an axis direction of the main spindle to detect a cut off condition of the rod material,
wherein the positioning block includes a path that allows movement of the detector, and moves in a same direction as a movement direction of the detector between a position that contacts the rod material and a position that has no contact with the rod material, and
the detector moves along the path when the positioning block moves to the position that has no contact with the rod material.

2. The machine tool according to claim 1, wherein
the positioning block is fixed to a tool post on which a cutting-off tool for cutting off the rod material is mounted.

3. The machine tool according to claim 1, wherein
the positioning block includes a contact surface that a leading end surface of the rod material contacts, and
the path is a concave portion provided in the contact surface.

4. The machine tool according to claim 3, wherein
a center of the concave portion is aligned with a center of the leading end surface when the leading end surface contacts the contact surface.

5. The machine tool according to claim 2, wherein the positioning block includes a contact surface that a leading end surface of the rod material contacts, and the path is a concave portion provided in the contact surface.

* * * * *